United States Patent
Bousquet et al.

(10) Patent No.: US 12,435,667 B2
(45) Date of Patent: Oct. 7, 2025

(54) AIRCRAFT AIR SYSTEM WITH DEDICATED COMPRESSOR(S)

(71) Applicant: Pratt & Whitney Canada Corp., Longueuil (CA)

(72) Inventors: Michel Bousquet, Longueuil (CA); Kevin Nguyen, Montreal (CA); Ismael Bencheikh, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/211,075

(22) Filed: Jun. 16, 2023

(65) Prior Publication Data
US 2024/0418122 A1 Dec. 19, 2024

(51) Int. Cl.
| | |
|---|---|
| *F02C 7/047* | (2006.01) |
| *B64D 13/06* | (2006.01) |
| *B64D 15/00* | (2006.01) |
| *B64D 33/02* | (2006.01) |
| *F02C 5/06* | (2006.01) |
| *F02C 7/32* | (2006.01) |

(52) U.S. Cl.
CPC ............ *F02C 7/047* (2013.01); *B64D 13/06* (2013.01); *B64D 15/00* (2013.01); *B64D 33/02* (2013.01); *F02C 5/06* (2013.01); *F02C 7/32* (2013.01); *B64D 2013/0603* (2013.01); *B64D 2033/0233* (2013.01)

(58) Field of Classification Search
CPC ...... F02C 7/32; F02C 7/36; F02C 5/06; F02C 7/04; F02C 6/08; F02K 3/04; F02K 3/06
See application file for complete search history.

(56) References Cited

U.S. PATENT DOCUMENTS

| | | | |
|---|---|---|---|
| 5,114,100 A | 5/1992 | Rudolph | |
| 9,797,311 B2 * | 10/2017 | Suciu | ......... F02C 7/18 |
| 10,144,521 B2 | 12/2018 | Deroy | |
| 10,329,023 B2 | 6/2019 | Parmentier | |
| 10,443,544 B2 * | 10/2019 | Vaisman | ........... F02C 1/10 |
| 10,450,074 B2 | 10/2019 | Stieger | |
| 10,533,487 B2 * | 1/2020 | Thomassin | ......... F02B 37/12 |
| 10,662,960 B2 | 5/2020 | Ricordeau | |
| 11,072,429 B2 | 7/2021 | Schwarz | |
| 11,339,717 B2 | 5/2022 | Howarth | |

(Continued)

FOREIGN PATENT DOCUMENTS

EP 4015389 B1 4/2024

OTHER PUBLICATIONS

EP Search Report for EP Patent Application No. 24182646.0 dated Oct. 22, 2024.

*Primary Examiner* — Thuyhang N Nguyen
(74) *Attorney, Agent, or Firm* — Getz BalichLLC (57) ABSTRACT

A system is provided for an aircraft. This aircraft system includes a nacelle, an aircraft component, an aircraft propulsion system and an electric compressor. The aircraft component is arranged outside of the nacelle. The aircraft propulsion system includes a propulsor rotor and a powerplant configured to drive rotation of the propulsor rotor. The powerplant is housed within the nacelle. The electric compressor is housed within the nacelle and is fluidly discrete from the powerplant. The electric compressor is fluidly coupled with and is configured to provide compressed air to the aircraft component.

17 Claims, 4 Drawing Sheets

(56) References Cited

U.S. PATENT DOCUMENTS

| | | |
|---|---|---|
| 11,518,525 B2 | 12/2022 | Suciu |
| 2017/0184030 A1* | 6/2017 | Brousseau .............. F02K 3/115 |
| 2017/0363014 A1* | 12/2017 | Taylor ....................... F02C 7/32 |
| 2018/0202358 A1* | 7/2018 | Julien ....................... F02C 7/36 |
| 2018/0258859 A1* | 9/2018 | Suciu ...................... F02K 3/115 |
| 2018/0346142 A1* | 12/2018 | Ullyott ................. H02K 7/1823 |
| 2019/0383220 A1* | 12/2019 | Mackin .................. B64D 15/02 |
| 2020/0232394 A1* | 7/2020 | Herring .................... F02C 7/32 |
| 2020/0247548 A1 | 8/2020 | Fagundes |
| 2021/0001990 A1 | 1/2021 | Garcia Zuazo |
| 2021/0003080 A1 | 1/2021 | Woods |
| 2022/0333533 A1* | 10/2022 | Burd ........................ F02C 7/36 |

* cited by examiner

AIRCRAFT AIR SYSTEM WITH DEDICATED COMPRESSOR(S)

TECHNICAL FIELD

This disclosure relates generally to an aircraft and, more particularly, to an air system for the aircraft.

BACKGROUND INFORMATION

An air system for an aircraft may include an environmental control system (ECS), an anti-icing system and/or a de-icing system. A typical air system may bleed compressed air from one or more gas turbine engines; e.g., turboprop engines or turbofan engines. While such known air system arrangements have various benefits, there is room in the art for improvement.

SUMMARY

According to an aspect of the present disclosure, a system is provided for an aircraft. This aircraft system includes a nacelle, an aircraft component, an aircraft propulsion system and an electric compressor. The aircraft component is arranged outside of the nacelle. The aircraft propulsion system includes a propulsor rotor and a powerplant configured to drive rotation of the propulsor rotor. The powerplant is housed within the nacelle. The electric compressor is housed within the nacelle and is fluidly discrete from the powerplant. The electric compressor is fluidly coupled with and is configured to provide compressed air to the aircraft component.

According to another aspect of the present disclosure, another system is provided for an aircraft. This aircraft system includes a nacelle, an aircraft propulsion system and an air compressor. The aircraft propulsion system includes a propulsor rotor and a turbo-compounded heat engine configured to drive rotation of the propulsor rotor. The turbo-compounded heat engine is housed within the nacelle. The air compressor is housed within the nacelle and is fluidly decoupled from the turbo-compounded heat engine.

According to still another aspect of the present disclosure, another system is provided for an aircraft. This aircraft system includes a nacelle, an aircraft propulsion system and an air compressor. The aircraft propulsion system includes a propulsor rotor and a powerplant configured to drive rotation of the propulsor rotor. The powerplant is housed within the nacelle and includes a turbine rotor. The air compressor is housed within the nacelle and is fluidly decoupled from the powerplant. The air compressor includes a compressor rotor which is coaxial with the turbine rotor.

The aircraft system may also include an aircraft component arranged outside of the nacelle. The air compressor may be fluidly coupled with and may be configured to provide compressed air to the aircraft component.

The aircraft system may also include an electric motor housed within the nacelle and configured to drive a compressor rotor within the air compressor.

The turbo-compounded heat engine may include a heat engine and a turbine rotor. The air compressor may include a compressor rotor coaxial with the turbine rotor.

The aircraft system may also include an electric motor and a geartrain operatively coupling the turbo-compounded heat engine and the electric motor to the propulsor rotor.

The aircraft system may also include a first inlet into the nacelle and a second inlet into the nacelle. The first inlet into the nacelle may be fluidly coupled with the powerplant. The second inlet into the nacelle may be fluidly coupled with the electric compressor.

The first inlet may be arranged at a forward, upstream end of the nacelle. The second inlet may be arranged along a side of the nacelle.

The aircraft system may also include an inlet into the nacelle fluidly coupled, in parallel, with an inlet into the powerplant and an inlet into the electric compressor.

The aircraft system may also include an environmental control system configured to direct conditioned air into an aircraft cabin. The environmental control system may include the aircraft component.

The aircraft system may also include an icing system configured to reduce, prevent and/or remove ice accumulation on an exterior aircraft surface.

The aircraft system may also include an air system which includes the aircraft component, the electric compressor and an air circuit. The air circuit may extend through the electric compressor and bypass the powerplant.

The propulsor rotor may be an un-ducted propulsor rotor.

The powerplant may be configured as or otherwise include a heat engine.

The powerplant may be configured as or otherwise include a turbo-compounded intermittent internal combustion engine.

The powerplant may include a compressor section and a powerplant flowpath extending through the compressor section.

The powerplant may include a turbine section and a powerplant flowpath extending through the turbine section.

The electric compressor may include a compressor rotor and an electric motor coupled to and configured to drive rotation of the compressor rotor.

The electric compressor may be operatively decoupled from the powerplant.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
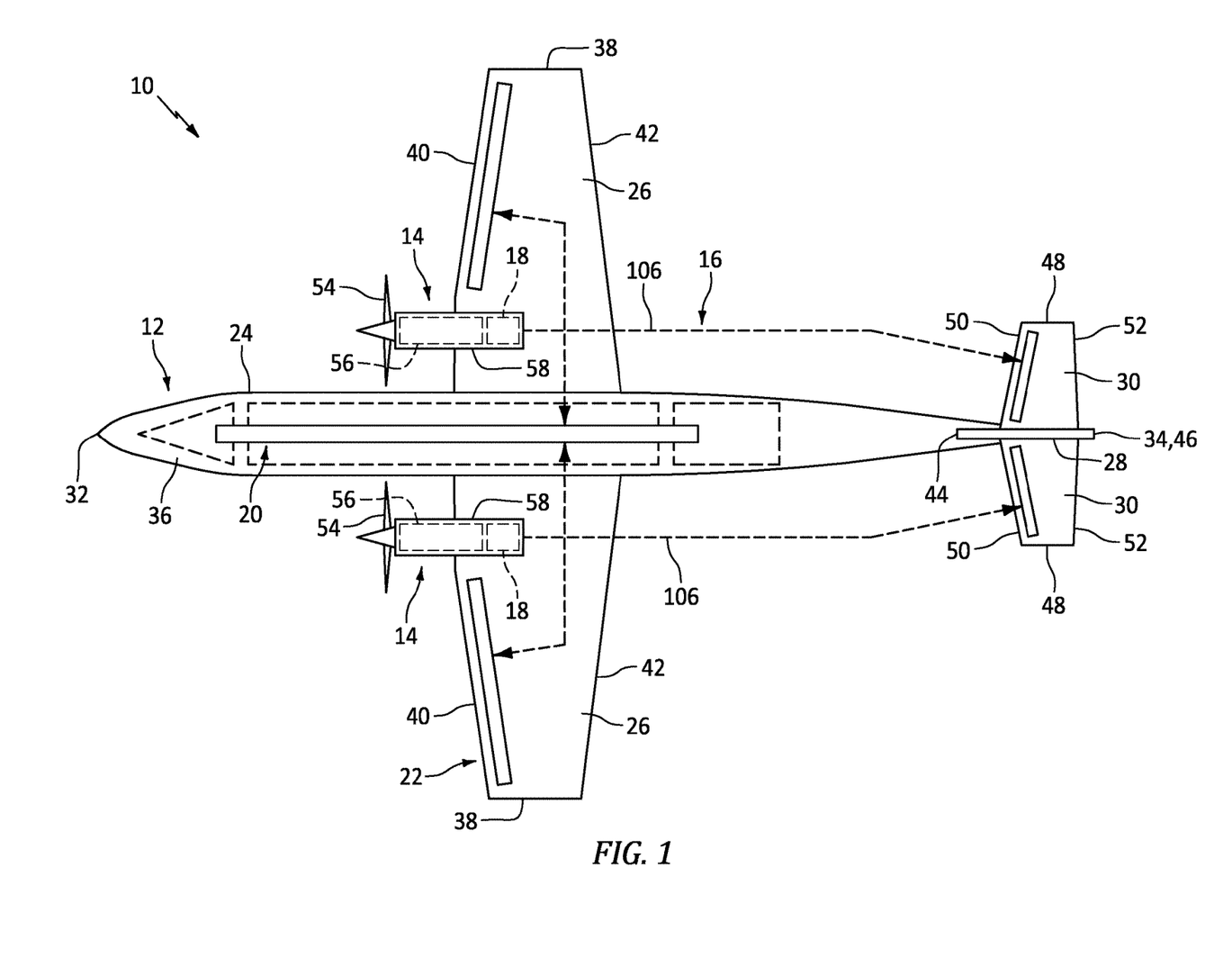
FIG. 1 is a schematic illustration of an aircraft.

FIG. 1 illustrates an aircraft 10 such as a passenger plane or a cargo plane. This aircraft 10 includes an airframe 12 and one or more propulsion systems 14 for the aircraft 10. The aircraft 10 also includes an air system 16. This air system 16 includes one or more air compressors 18, an environmental control system 20 (ECS) and an icing system 22. Briefly, the icing system 22 may be configured as or otherwise include an anti-icing system and/or a de-icing system.

The airframe 12 of FIG. 1 includes an aircraft fuselage 24 and one or more aircraft wings 26. The airframe 12 may also include one or more aircraft stabilizers 28 and 30.

The fuselage 24 extends longitudinally from a forward, upstream nose 32 of the aircraft 10 to (or about) an aft, downstream tail 34 of the aircraft 10. The fuselage 24 includes an internal cabin 36 which is environmentally controlled by the environmental control system 20. This internal cabin 36 may include a cockpit of the aircraft 10, a passenger compartment of the aircraft 10 and/or a cargo compartment of the aircraft 10.

The wings 26 of FIG. 1 are arranged on opposing lateral sides of the fuselage 24. Each of the wings 26 is connected to the fuselage 24. Each of the wings 26 projects spanwise out from the fuselage 24, along a span line of the respective wing 26, to a tip 38 of the respective wing 26. Each of the wings 26 extends chordwise, along a chord of the respective wing 26, from a forward, upstream leading edge 40 of the respective wing 26 to an aft, downstream trailing edge 42 of the respective wing 26.

The vertical stabilizer 28 of FIG. 1 is arranged at (e.g., on, adjacent or proximate) the tail 34 of the aircraft 10. This vertical stabilizer 28 is connected to the fuselage 24. The vertical stabilizer 28 projects vertically out from the fuselage 24, along a span line of the vertical stabilizer 28, to a tip of the vertical stabilizer 28. The vertical stabilizer 28 extends chordwise, along a chord of the vertical stabilizer 28, from a forward, upstream leading edge 44 of the vertical stabilizer 28 to an aft, downstream trailing edge 46 of the vertical stabilizer 28.

The horizontal stabilizers 30 of FIG. 1 are arranged on opposing lateral sides of the vertical stabilizer 28, for example at the tip of the vertical stabilizer 28. Each of the horizontal stabilizers 30 projects spanwise out from the vertical stabilizer 28, along a span line of the respective horizontal stabilizer 30, to a tip 48 of the respective horizontal stabilizer 30. Each of the horizontal stabilizers 30 extends chordwise, along a chord of the respective horizontal stabilizer 30, from a forward, upstream leading edge 50 of the respective horizontal stabilizer 30 to an aft, downstream trailing edge 52 of the respective horizontal stabilizer 30. The present disclosure, however, is not limited to such an exemplary horizontal stabilizer arrangement. The horizontal stabilizers 30, for example, may alternatively be connected to and project out from opposing lateral sides of the fuselage 24.

Figure 2:
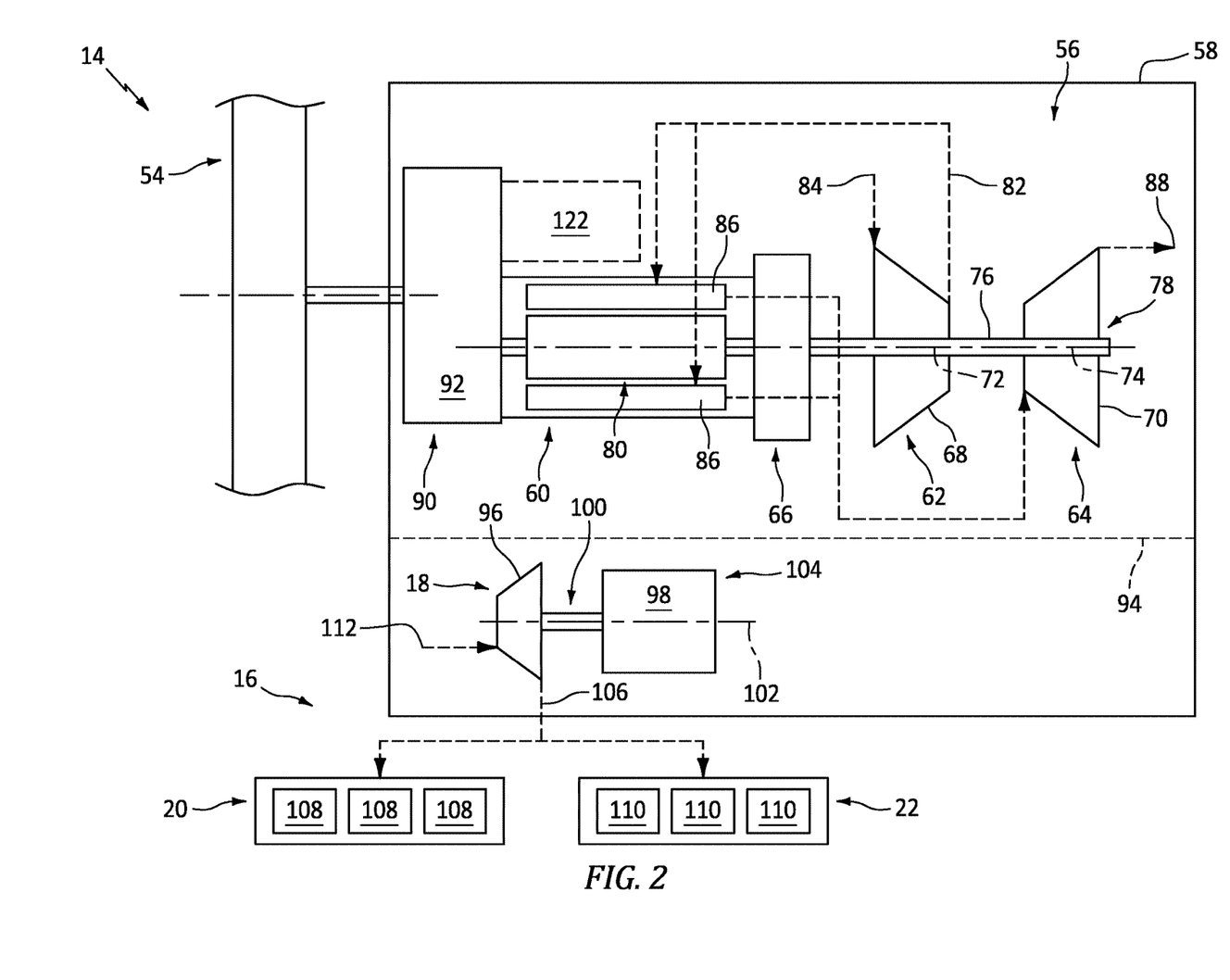
FIG. 2 is a schematic illustration of a propulsion system with an air system for the aircraft.

The aircraft propulsion systems 14 of FIG. 1 are arranged on opposing lateral sides of the fuselage 24. Each aircraft propulsion system 14 of FIG. 1, for example, is mounted to a respective one of the wings 26. Referring to FIG. 2, each aircraft propulsion system 14 includes at least (or only) one open propulsor rotor 54 and a propulsion system powerplant 56.

The propulsor rotor 54 of FIG. 2 is configured as an open, un-ducted air mover for the aircraft propulsion system 14. The propulsor rotor 54, for example, may be a propeller rotor for a propeller (e.g., turboprop) propulsion system. Alternatively, the propulsor rotor 54 may be a propfan rotor for a propfan propulsion system, a pusher fan rotor for a pusher fan propulsion system, or any other type of un-ducted propulsor rotor. The propulsor rotor 54 includes a rotor disk (or hub) and a plurality of open, un-ducted propulsor blades arranged circumferentially around and connected to the rotor disk. The propulsor rotor 54 of FIG. 2 and its propulsor blades are disposed outside of a nacelle 58 for the respective aircraft propulsion system 14; e.g., an aerodynamic cover/housing. For ease of description, the propulsor rotor 54 may be generally described below as the propeller rotor for the propeller propulsion system. The present disclosure, however, is not limited to such an arrangement. Moreover, it is contemplated the open propulsor rotor 54 may be replaced by a ducted propulsor rotor (e.g., a fan rotor for a turbofan propulsion system, a compressor rotor for a turbojet propulsion system, etc.) in other embodiments.

The powerplant 56 may be configured as a turbo-compounded heat engine. The powerplant 56 of FIG. 2, for example, includes a heat engine 60, a powerplant compressor section 62, a powerplant turbine section 64 and a powerplant geartrain 66; e.g., a turbine gearbox. This powerplant 56 and each of its members 60, 62, 64 and 66 are housed within the nacelle 58.

The heat engine 60 may be configured as or otherwise include an intermittent internal combustion (IC) engine ("intermittent combustion engine"). The intermittent combustion engine is an internal combustion (IC) engine in which a mixture of fuel and air is intermittently (e.g., periodically) detonated within the engine. Examples of the intermittent combustion engine include, but are not limited to, a reciprocating piston engine (e.g., an inline (I) engine, a V-engine, a W-engine, etc.), a rotary engine (e.g., a Wankel engine), a rotating detonation engine and a pulse detonation engine. The present disclosure, however, is not limited to intermittent combustion engine applications. The heat engine 60 and, more generally, the powerplant 56 may alternatively be configured as or otherwise include a continuous internal combustion engine (e.g., a gas turbine engine) or another type of thermal engine.

The compressor section 62 includes a bladed compressor rotor 68 (e.g., a centrifugal or axial compressor rotor), and the turbine section 64 includes a bladed turbine rotor 70 (e.g., a centrifugal or axial turbine rotor). Each of these powerplant rotors 68, 70 includes a plurality of rotor blades arranged circumferentially around and connected to one or more respective rotor disks (or hubs). The compressor rotor 68 is rotatable about a compressor axis 72. The turbine rotor 70 is rotatable about a turbine axis 74, which turbine axis 74 may be parallel (e.g., coaxial) with the compressor axis 72. The turbine rotor 70 may be coupled to the compressor rotor 68 through an intermediate shaft 76. Here, at least (or only) the compressor rotor 68, the turbine rotor 70 and the intermediate shaft 76 may collectively form a rotating assembly 78; e.g., a spool. The rotating assembly 78 and its turbine rotor 70 may also be coupled to an internal rotating assembly 80 of the heat engine 60 (e.g., the intermittent combustion engine) through the powerplant geartrain 66 (or otherwise).

The powerplant 56 of FIG. 2 includes an internal powerplant flowpath 82; e.g., a core flowpath. The powerplant flowpath 82 of FIG. 2 extends from an airflow inlet 84 into the powerplant 56, sequentially through the compressor section 62, one or more combustion zones 86 (e.g., combustion chambers, cylinder chambers, etc.) within the heat engine 60 and the turbine section 64, to a combustion products exhaust 88 from the powerplant 56. With this arrangement, the air delivered to the heat engine 60 is compressed by the compressor rotor 68, and combustion products generated by combustion of the air-fuel mixture within the combustion zone(s) 86 drives rotation of the turbine rotor 70. The rotation of the turbine rotor 70 drives rotation of the compressor rotor 68 to facilitate the compression of the incoming air to the heat engine 60. The rotation of the turbine rotor 70 may also assist driving rotation of the rotating assembly 80. Of course, the combustion of the air-fuel mixture within the combustion zone(s) 86 also directly drives rotation of the rotating assembly 80 of the heat engine 60.

The powerplant 56 and its heat engine 60 are operatively coupled to the propulsor rotor 54. The rotating assembly 80 of FIG. 2, for example, is coupled to and rotatable with the propulsor rotor 54 through a propulsor drivetrain 90. This propulsor drivetrain 90 may be configured as a geared drivetrain, where a propulsor geartrain 92 (e.g., a transmission, a speed change device, an epicyclic geartrain, etc.) is disposed between and operatively couples the propulsor rotor 54 to the rotating assembly 80. With this arrangement, the propulsor rotor 54 may rotate at a different (e.g., slower) rotational velocity than the rotating assembly 80. However, the propulsor drivetrain 90 may alternatively be configured as a direct drive drivetrain, where the propulsor geartrain 92 is omitted. With this arrangement, the propulsor rotor 54 rotates at a common (the same) rotational velocity as the rotating assembly 80.

Referring to FIG. 1, each air compressor 18 may be arranged with a respective one of the aircraft propulsion systems 14. The air compressor 18 of FIG. 2, for example, is housed within the nacelle 58 proximate a respective powerplant 56. The air compressor 18 and the powerplant 56 may be located within a common compartment of the nacelle 58; e.g., next to one another. Alternatively, the air compressor 18 and the powerplant 56 may be located in discrete compartments of the nacelle 58; e.g., see dashed line inter-compartment wall 94.

The air compressor 18 of FIG. 2 includes an air compressor rotor 96 coupled to an electric motor 98 through a compressor drivetrain 100; e.g., a shaft. The electric motor 98 is configured to drive rotation of the air compressor rotor 96 about its rotational axis 102. At least (or only) the air compressor 18, the electric motor 98 and the compressor drivetrain 100 may collectively form a respective electric air compressor 104 ("electric compressor"). This electric compressor 104 of FIG. 2 is operatively decoupled from the powerplant 56. The powerplant 56 of FIG. 2, for example, is not operable to mechanically drive rotation of the air compressor rotor 96. However, it is contemplated the powerplant 56 may include an electric generator which may provide electric power to the electric motor 98. The electric motor 98 may also or alternatively be electrically powered by an electricity source outside of the nacelle 58; e.g., a battery bank and/or an electric bus within the fuselage 24 (see FIG. 1).

Figure 3A:
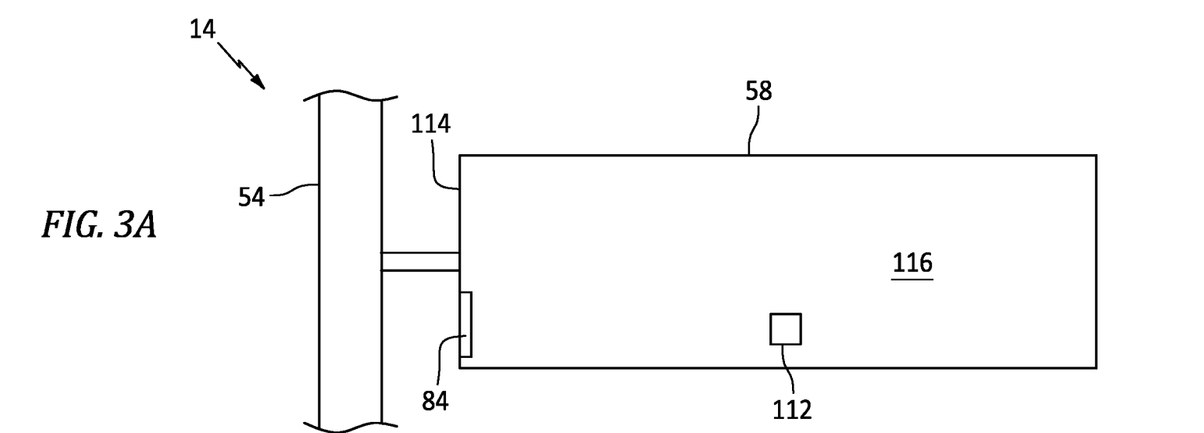
FIGS. 3A and 3B are schematic illustrations of various airflow inlet arrangements for the propulsion system and the air system.
Figure 3B:
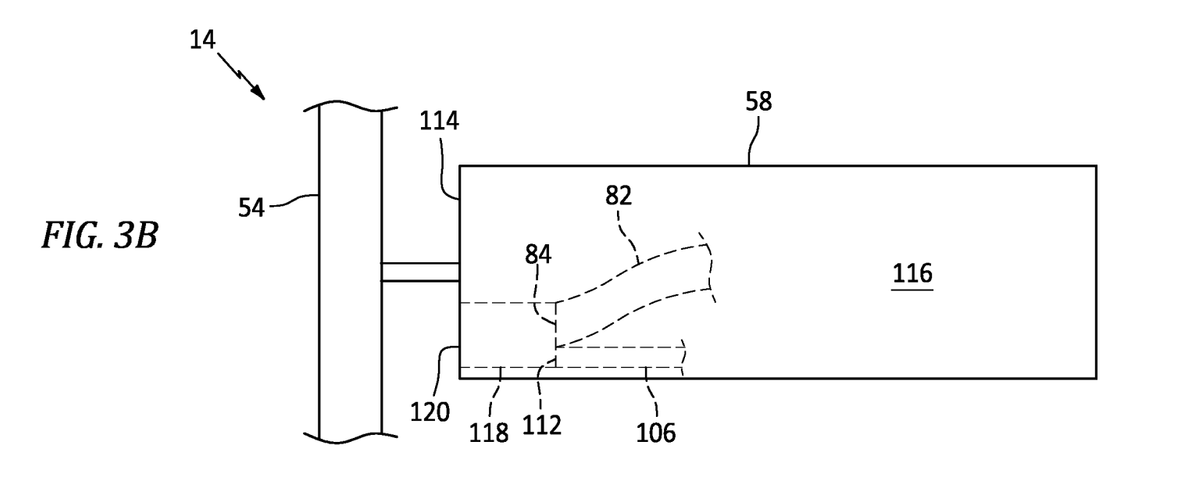

The air compressor 18 may be fluidly discrete from the powerplant 56. The air system 16 of FIG. 2, for example, includes an air circuit 106 (e.g., an air flowpath) which extends through the air compressor 18 to one or more components 108 (e.g., nozzles, ducts, heat exchangers, etc.) of the environmental control system 20 and/or one or more components 110 (e.g., nozzles, ducts, heat exchangers, etc.) the icing system 22. This air circuit 106 is fluidly decoupled from (e.g., does not receive air from, bypasses, etc.) the powerplant 56 and its powerplant flowpath 82. For example, referring to FIG. 3A, an airflow inlet 112 into the air circuit 106 may also be configured as a (e.g., standalone) airflow inlet into the nacelle 58. Similarly, the powerplant inlet 84 may be configured as another (e.g., standalone) airflow inlet into the nacelle 58. This powerplant inlet 84 may be disposed at (or about) a forward, upstream end 114 of the nacelle 58, for example behind/slightly downstream of the propulsor rotor 54. The air system inlet 112, on the other hand, may be disposed further aft along a lateral side 116 of the nacelle 58. Alternatively, referring to FIG. 3B, the air system inlet 112 and the powerplant inlet 84 may be independently fluidly coupled (e.g., in parallel) to an inlet duct 118. This inlet duct 118 is configured to direct incoming air entering the nacelle 58 through a nacelle inlet 120 independently into the powerplant inlet 84 and the air system inlet 112; however, the inlet duct 118 may be biased to direct (e.g., significantly) more incoming air into the powerplant inlet 84. The present disclosure, however, is not limited to the foregoing exemplary air flow arrangements.

The air compressor 18 of FIG. 2 is configured to compress the air directed into/received by the air circuit 106. The air circuit 106 is configured to direct that compressed air to the environmental control system 20 and/or the icing system 22. The air compressor 18 of FIG. 2, for example, is fluidly coupled with the environmental control system components 108 and/or the icing system components 110 through (e.g., one or more legs of) the air circuit 106, which environmental control system components 108 and icing system components 110 are located outside of the nacelle 58; e.g., elsewhere along and/or within the airframe 12 of FIG. 1. The air compressor 18 of FIG. 2 may also be configured as a dedicated compressor for the environmental control system 20 and the icing system 22. For example, all of the air compressed by the air compressor 18 may be delivered to the environmental control system 20 and/or the icing system 22; e.g., not to any other aircraft systems or components.

Referring to FIG. 1, the environmental control system 20 is configured to condition (e.g., cool, heat, filter, etc.) the compressed air received from the air compressors 18. The environmental control system 20 may then direct the conditioned air into the aircraft fuselage 24 and its internal cabin 36. Various types and arrangements of environmental control systems are known in the art, and the present disclosure is not limited to any particular ones thereof.

The icing system 22 is configured to use the compressed air received from the air compressor 18 to reduce or prevent ice accumulation on one or more exterior aircraft surfaces. The icing system 22 may also or alternatively be configured to use the compressed air received from the air compressor 18 to remove any ice accumulation on the exterior aircraft surfaces. Examples of the exterior aircraft surfaces include, but are not limited to, any one or more of the surfaces forming any one or more of the leading edges 40, 44 and 50 of FIG. 1. The exterior aircraft surfaces may also or alternatively include various control surfaces along the wings 26 and/or the stabilizers 28 and/or 30. Various types and arrangements of icing systems (e.g., anti-icing systems and/or deicing systems) are known in the art, and the present disclosure is not limited to any particular ones thereof.

With the foregoing arrangement, the air compressors 18 may be operated to provide air to the environmental control system 20 and/or the icing system 22 without creating a mechanical power drag on the powerplant 56. The air system 16 of FIGS. 1 and 2 does not utilize bleed air from the powerplants 56. Each powerplant 56 may thereby have increased operational efficiency. The electric compressors 104 may also be operated to meet environmental control system and/or icing system air demand independent of an operational speed of or power demand on the powerplants 56. Moreover, the powerplant-air compressor pair may be used to retrofit existing (e.g., older) aircraft which utilize bleed air from an engine compressor without re-engineering existing environmental control and/or icing systems already plumbed to the nacelles.

Figure 4:
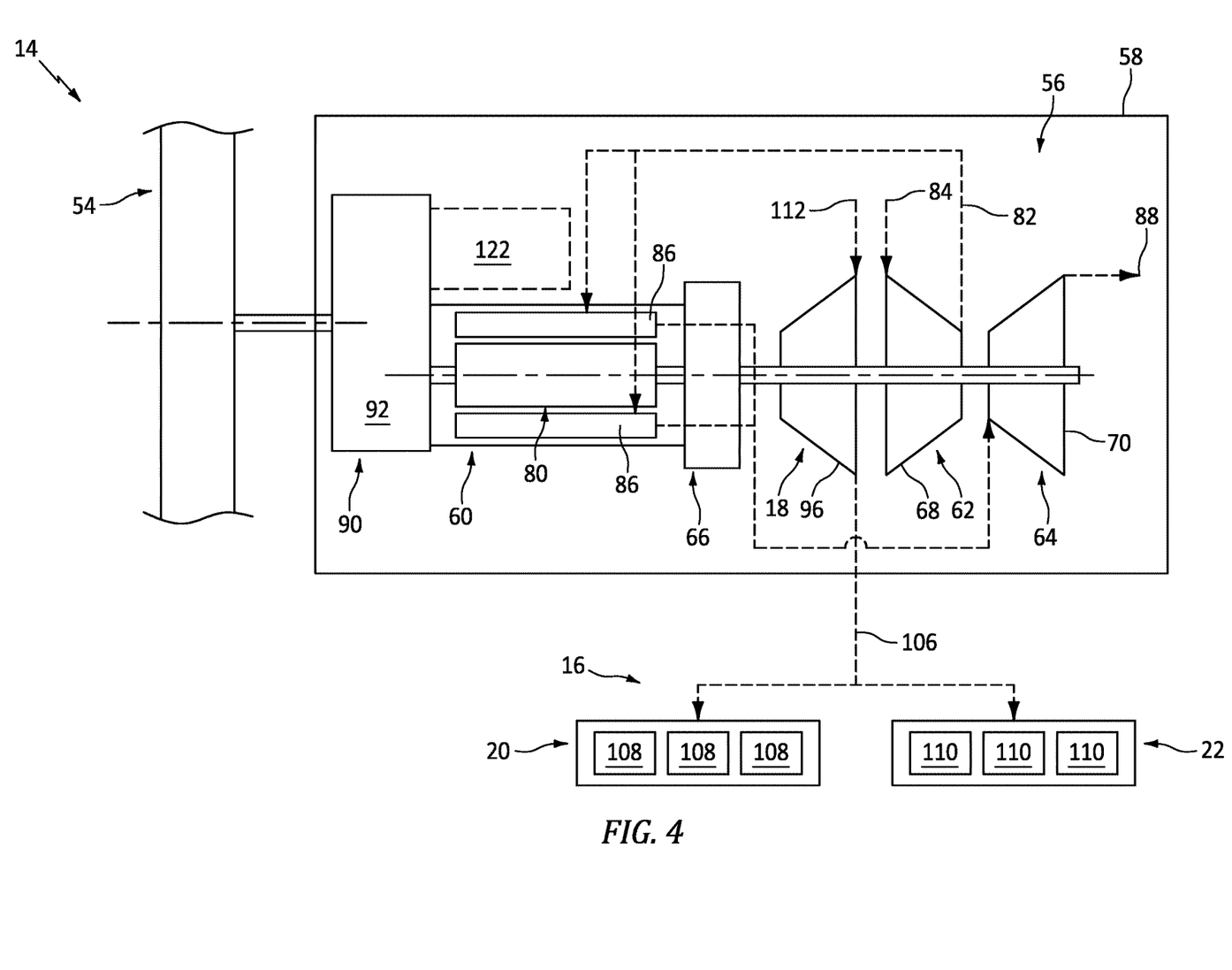
FIG. 4 is a schematic illustration of the propulsion system with a compressor of the air system integrated with the propulsion system.

In some embodiments, referring to FIG. 2, each air compressors 18 may be mechanically powered by the electric motor 98. In other embodiments, referring to FIG. 4, each air compressor 18 may alternatively be operatively coupled to and mechanically powered by the respective powerplant 56. The air compressor rotor 96 of FIG. 4, for example, is coupled to/integrated with the compressor rotor 68 and/or the turbine rotor 70. The air compressor rotor 96 may also be coaxial with the compressor rotor 68 and/or the turbine rotor 70. With this arrangement, the turbine rotor 70 may drive rotation of both the compressor rotor 68 and the air compressor rotor 96. The compressor section 62 and the air compressor 18, however, may still be fluidly discrete as described above.

In some embodiments, referring to FIG. 2, the powerplant 56 may be configured as an electric hybrid powerplant. The powerplant 56 of FIG. 2, for example, includes an electric motor 122 configured to further (e.g., selectively) drive rotation of the propulsor rotor 54. The propulsor geartrain 92 of FIG. 2, for example, couples both the heat engine 60 and the electric motor 122 to the propulsor rotor 54.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a nacelle including a first inlet and a second inlet, wherein the second inlet is disposed along a lateral side of the nacelle;
an aircraft component arranged outside of the nacelle;
an aircraft propulsion system including a propulsor rotor and a powerplant configured to drive rotation of the propulsor rotor, the powerplant housed within the nacelle;
an electric compressor housed within the nacelle and fluidly discrete from the powerplant for an entire operating time of the powerplant, the electric compressor fluidly coupled with and configured to provide compressed air to the aircraft component, and the electric compressor operatively decoupled from the powerplant;
the first inlet into the nacelle fluidly coupled with the powerplant; and
the second inlet into the nacelle fluidly coupled with the electric compressor;
the first inlet arranged at a forward, upstream end of the nacelle and upstream of the second inlet.

2. The system of claim 1, wherein
the second inlet is arranged along a side of the nacelle.

3. The system of claim 1, further comprising an environmental control system configured to direct conditioned air into an aircraft cabin, the environmental control system comprising the aircraft component.

4. The system of claim 1, further comprising an icing system configured to reduce, prevent and/or remove ice accumulation on an exterior aircraft surface.

5. The system of claim 1, further comprising:
an air system including the aircraft component, the electric compressor and an air circuit;
the air circuit extending through the electric compressor and bypassing the powerplant.

6. The system of claim 1, wherein the propulsor rotor is an un-ducted propulsor rotor.

7. The system of claim 1, wherein the powerplant comprises a heat engine.

8. The system of claim 1, wherein the powerplant comprises a turbo-compounded intermittent internal combustion engine.

9. The system of claim 1, wherein the powerplant comprises a compressor section and a powerplant flowpath extending through the compressor section.

10. The system of claim 1, wherein the powerplant comprises a turbine section and a powerplant flowpath extending through the turbine section.

11. The system of claim 1, wherein the electric compressor includes a compressor rotor and an electric motor coupled to and configured to drive rotation of the compressor rotor.

12. A system for an aircraft, comprising:
a nacelle including a first standalone inlet and a second standalone inlet, wherein the second standalone inlet is disposed along an aft lateral side of the nacelle;
an aircraft propulsion system including a propulsor rotor and a turbo-compounded heat engine configured to drive rotation of the propulsor rotor, the turbo-compounded heat engine housed within the nacelle;
an aircraft component arranged outside of the nacelle;
an air compressor housed within the nacelle and fluidly decoupled from the turbo-compounded heat engine for an entire operating time of the turbo-compounded heat engine, the
air compressor fluidly coupled with and configured to provide compressed air to the aircraft component;
the first standalone inlet into the nacelle fluidly coupled with the turbo-compounded heat engine; and
the second standalone inlet into the nacelle fluidly coupled with the air compressor;
the first standalone inlet arranged at a forward, upstream end of the nacelle and upstream of the second standalone inlet.

13. The system of claim 12, further comprising an electric motor housed within the nacelle and configured to drive a compressor rotor within the air compressor.

14. The system of claim 12, further comprising:
an electric motor; and
a geartrain operatively coupling the turbo-compounded heat engine and the electric motor to the propulsor rotor.

15. The system of claim 12, wherein the propulsor rotor is disposed outside of the nacelle.

16. A system for an aircraft, comprising:
a nacelle including an inter-compartment wall;
an aircraft component arranged outside of the nacelle;
an aircraft propulsion system including a propulsor rotor and a powerplant configured to drive rotation of the propulsor rotor, the powerplant housed within a first compartment in the nacelle;
an air system including the aircraft component, an electric compressor and an air circuit, the air circuit extending through the electric compressor to the aircraft component, and the air circuit bypassing the powerplant;
the electric compressor housed within a second compartment in the nacelle and fluidly discrete from the powerplant for an entire operating time of the powerplant, the electric compressor fluidly coupled with and configured to provide compressed air to the aircraft component; and the inter-compartment wall separating the first compartment from the second compartment.

17. The system of claim 16, wherein the propulsor rotor comprises an open propulsor rotor.

\* \* \* \* \*